United States Patent

[11] 3,603,536

[72] Inventor Heinz Dochow
 Sachsenried Ueber Schongau, Germany
[21] Appl. No. 791,668
[22] Filed Jan. 16, 1969
[45] Patented Sept. 7, 1971
[73] Assignee Richard Kohnke Fallschirmwerk
 Ziegelhausen bei Heidelberg, Germany

[54] CARGO PARACHUTE ASSEMBLY
 2 Claims, 7 Drawing Figs.
[52] U.S. Cl. .................................................. 244/142
[51] Int. Cl. .................................................. B64d 17/40
[50] Field of Search ........................................ 244/142,
 147, 148, 145

[56] References Cited
UNITED STATES PATENTS

| | | | |
|---|---|---|---|
| 1,909,158 | 5/1933 | Albihn.......................... | 244/147 |
| 2,396,126 | 3/1946 | Quilter et al. ................ | 244/148 |
| 2,495,873 | 1/1950 | Strong.......................... | 244/145 |
| 2,762,589 | 9/1956 | Frieder et al. ................ | 244/148 |
| 3,018,074 | 1/1962 | Quilter ........................ | 244/147 |

Primary Examiner—Milton Buchler
Assistant Examiner—Carl A. Rutledge
Attorneys—Francis D. Stephens and Hugo Huettig, Jr.

ABSTRACT: The pilot parachute and the cargo parachute, together with all of their fittings, are assembled and packaged as one single complete unit.

INVENTOR
HEINZ DOCHOW

CARGO PARACHUTE ASSEMBLY

This invention relates to a cargo parachute assembly. It is one of the objects of this invention, to avoid the difficulties and operational malfunctions likely to occur utilizing conventional equipment by simplification of aerial delivery systems and the method of handling such equipment. It is a further object to prolong allowable storage time for such type equipment. Also, according to this invention depot maintenance shall be deleted and considerable savings in material and labor are obtained.

For the opening procedure a cargo parachute requires utilization of a pilot chute. A clevis is required to facilitate attachment to the load. In conventional cargo parachute assemblies, pilot chute with pack and clevis are designated separate items, being kept under separate storage. In order to decrease aircraft standby periods, proper vehicles transport the prepared loads from depot or open storage to the airfield. The loads are transferred to the aircraft and properly lashed. According to conventional systems, cargo parachutes, pilot chutes and clevis are withdrawn from separate storage as required and transported to the aircraft. In alert takeoffs, cargo parachutes often have to be prepared on the vehicle, in the aircraft or in flight, with no or inadequate light available. Cargo parachute container with canopy is placed upon load, with open container mouth pointing in direction of delivery. Break cords threaded through grommets provided for on parachute container fasten parachute assembly to load. Pilot chute connector strap is attached to container bridle loops by means of a separable connector link. Pilot chute pack is positioned behind and beneath cargo parachute container facing the nose of the aircraft and tied to the load with two break cords. The strap connecting pilot chute and container bridle loops is placed in S-folds with the ends being secured with rubber retainer bands. The static line connector snap is placed upon load. The open clevis is attached to suspension web connector strap loops. The attaching loops of the aerial delivery container are positioned on clevis bolt and secured with tape. Conventional rigging and installation systems require employment of trained personnel. The loss of important connecting and/or attaching elements may result in total failure of the aerial delivery mission, as spare parts may not be available.

This invention therefore comprises a cargo parachute assembly, in which cargo parachute canopy with container, pilot chute with pack, clevis and their connecting elements represent one complete unit, with no components to be lost. Further comprising a cargo parachute assembly available at low cost, with extreme maintenance-free storage capabilities. Thus, an expendable item of equipment that need not be recovered upon serving its mission, unless so desired for particular reasons.

According to this invention, the complete assembly consisting of cargo parachute canopy and container, pilot chute canopy and pack, load connecting clevis with connector straps represent one solid unit, with pilot chute connector strap permanently attached to bridle of cargo parachute container, with pilot chute pack buttoned to bottom of cargo parachute container, with load connecting clevis already installed on suspension web connector straps, positioned inside cargo parachute container. An advantage is to be found in the detachable fastening of pilot chute pack to cargo parachute container. The release straps, sewn to the inside of the container cross each other at the opening provided for in the bottom panel and form the bridle loop utilized for pilot chute connector strap attachment.

Again, according to this invention the cargo parachute assembly comprises cargo parachute and pilot chute containers, being manufactured of heat and cold resistant, airtight, waterproof and durable material of ultimate strength. These requirements are accomplished by utilization of woven HOSTALEN-strip material, high pressure treated with double-face polyethylene coating.

Cargo parachute canopy and pilot chute canopy are preferably manufactured using a multidirectional, nonwoven bonded mat material of any fiber.

The cargo parachute combination in accordance with this invention serves every purpose required. CArgo parachute and pilot chute canopies with containers, clevis and connecting elements represent one complete and solid unit, that may be stored and transported as such, with construction features allowing for expedient, reliable and safe attachment to load even by unskilled personnel. Compared to conventional cargo parachute systems, weight and dimensions of said cargo parachute assembly have been considerably reduced.

In accordance with this invention, maintenance of the equipment is no longer required, allowing for guaranteed immediate application of said equipment. The possible loss of components has been completely deleted. Materials utilized in the manufacture of canopies and containers allow for extreme storage conditions and periods, with temperatures ranging from $-50°$ C. up to $+70°$ C. In accordance with this invention, the cargo parachute assembly may be classified expendable equipment, due to low manufacturing cost and considerable expenditures for an intended recovery. Simplicity of construction and appropriate manufacturing methods yet using strong materials add to this feature.

This invention is further described with reference to the accompanying drawings, in which.

Figure 1:
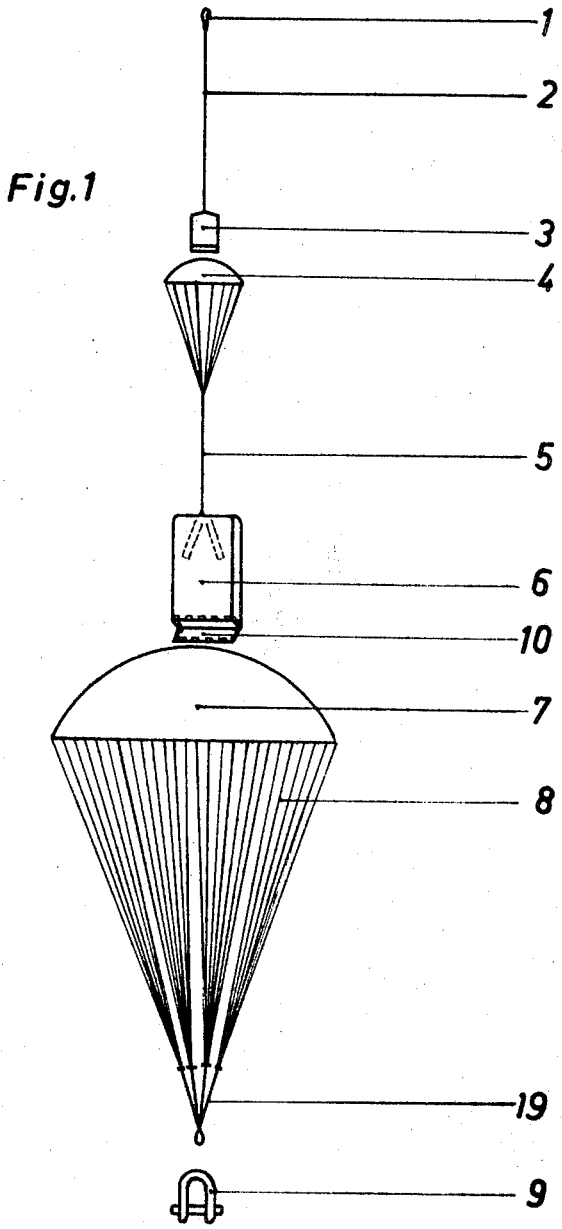
FIG. 1 illustrates one form of cargo parachute assembly according to the invention.

Connector snap 1 at static line 2 of pilot chute pack is attached to anchor cable in the aircraft. Upon dropping the load static line 2 is released from retainer loops. Static line deployment withdraws pilot chute canopy 4 from pack 3. Pilot chute inflates. The drag of the pilot chute is transferred from pilot chute connector strap 5 to container 6 of cargo parachute 7,8. As the load falls free of the aircraft suspension webs 8 are withdrawn from container 6, permitting canopy 7 of cargo parachute 7,8 to deploy. Deployment and inflation of cargo parachute 7,8 are being controlled by break cord ties in the conventional manner. The clevis 9 is the load attaching element between suspension webs 8, suspension web connector straps 19 and main parachute 7,8.

Figure 2:
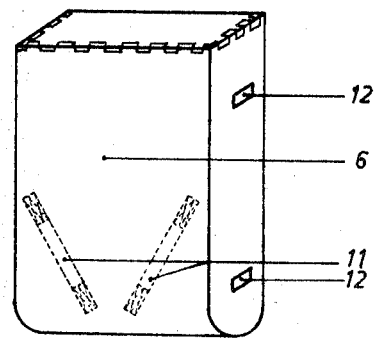
FIG. 2 is perspective view of a closed cargo parachute container.
Figure 3:
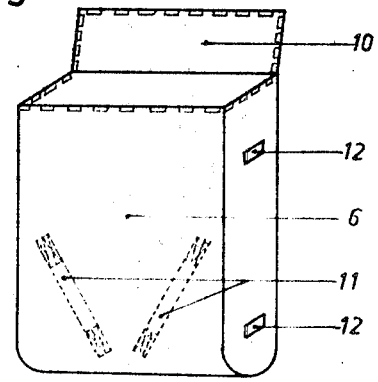
FIG. 3 is a similar view of the container as in FIG. 2 in open condition.

In accordance with FIGS. 2 through 5 the container 6 of main parachute 7,8 comprises a bag that is closed by lacing, with release straps sewn to the inside of the container, crossing each other at the opening provided for in the bag bottom. FIG. 2 illustrates the container 6 closed and laced up. Fig. 3 shows container in open condition. The closing flap 10 is a permanent part of container 6. The three open edges are fastened to the top edges of the container by means of a thread line, pulled through a continuous row of loops provided for around the top edges of the container and around the three open edges of the closing flap. Two each retainer loops 12 are sewn to the side panels of the container 6 and provide break cord tie attachments fastening cargo parachute assembly to load.

Figure 5:
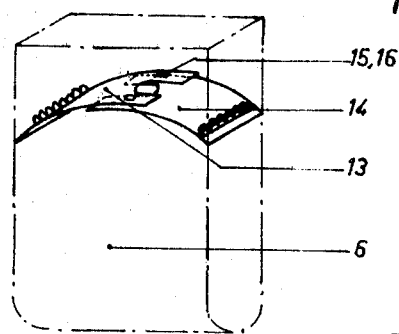
FIG. 5 is a schematic perspective view showing the protector flaps as in FIG. 4 sewn to side panels of container as per FIGS. 2 and 3.
Figure 4:
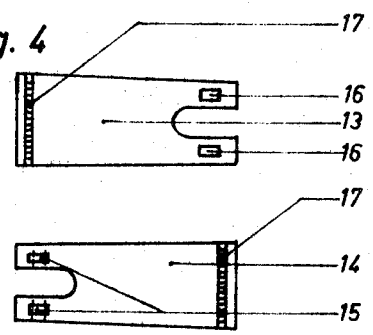
FIG. 4 is top view of protector flaps with suspension web retainer loops.

Protector flaps 13 and 14, FIGS. 4 and 5, are sewn to inside of container side panels 6 as shown in FIG. 5. These protector flaps 13 and 14 separate the folded canopy 7 and suspension webs 8, which are positioned on top of flaps 13 and 14 and stowed to retainer loops 17. The two protector flaps are secured to each other by pulling loops 15 of flap 14 through openings 16 of flap 13. Figure 5 illustrates the installation.

Figure 6:
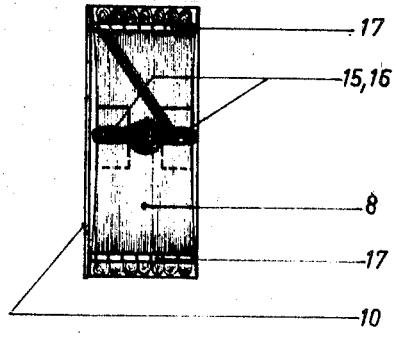
FIG. 6 is a cross-sectional view showing stowed suspension webs on protector flaps.

FIG. 6 shows completed procedure of securing protector flaps 13 and 14 by pulling loops 15 through openings 16 and stowing suspension webs 8 in retainer loops 17 of protector flaps 13 and 14.

Figure 7:
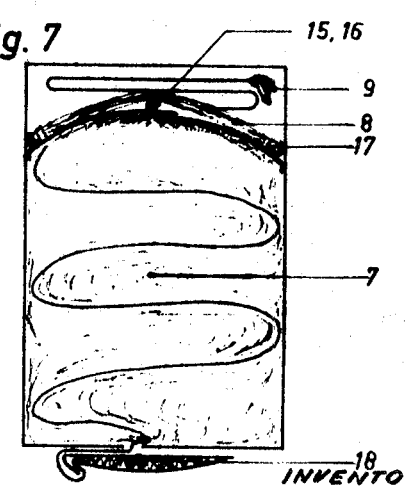
FIG. 7 is vertical sectional view of complete cargo parachute assembly.

FIG. 7 illustrates separable attachment of pilot chute pack, consisting of items 1 through 5 to bottom of main parachute container 6 holding canopy 7 and suspension webs 8.

According to this invention, the cargo parachute assembly may be manufactured in various sizes, ranging from small to medium and large load capacities. Parachutes according to this invention may also be utilized for man-carrying purposes. The parachute assembly with containers and canopies manufactured of material in accordance with this invention shall be classified expendable equipment for one-time application.

This invention is not restricted to the particular embodiments described herein, but embraces other embodiments falling within the scope of the appended claims.

Having now described the means by which the objects of this invention are obtained,

I claim:

1. A cargo parachute assembly composed of a single preassembled unit comprising a container (6) having inside main panels, a cargo parachute (7,8) in said container, a pack (3) containing a pilot parachute canopy (4) permanently attached to said container (6) by a pilot parachute connector strap (5), bottom means separately fastening said pack (3) to said container (6), means securing a load connective clevis (9) to said cargo parachute, release straps (11) sewn to the inside main panels of said container (6), said straps crossing each other at the bottom of said container (6) and forming a bridle loop for the attachment of said connector strap (5), and said container (6) and said pack (3) being composed of woven HOSTALEN-strip material high pressure treated with double-faced polyethylene coating for being heat and cold resistant, airtight, waterproof and of durable material of ultimate strength.

2. An assembly as in claim 1, said cargo parachute canopy (7) and said pilot chute canopy (4) being composed of a multidirectional, nonwoven, bonded fibrous mat material.